(12) United States Patent
Kagei et al.

(10) Patent No.: US 8,703,341 B2
(45) Date of Patent: *Apr. 22, 2014

(54) POSITIVE ELECTRODE ACTIVE MATERIAL FOR LITHIUM BATTERY

(75) Inventors: Shinya Kagei, Takehara (JP); Keisuke Miyanohara, Takehara (JP); Yoshimi Hata, Takehara (JP); Yasuhiro Ochi, Takehara (JP); Kenji Sasaki, Takehara (JP)

(73) Assignee: Mitsui Mining & Smelting Co., Ltd. (JP)

( * ) Notice: Subject to any disclaimer, the term of this patent is extended or adjusted under 35 U.S.C. 154(b) by 136 days.

This patent is subject to a terminal disclaimer.

(21) Appl. No.: 13/259,310

(22) PCT Filed: Mar. 31, 2010

(86) PCT No.: PCT/JP2010/055829
§ 371 (c)(1),
(2), (4) Date: Sep. 23, 2011

(87) PCT Pub. No.: WO2010/114015
PCT Pub. Date: Oct. 7, 2010

(65) Prior Publication Data
US 2012/0012776 A1     Jan. 19, 2012

(30) Foreign Application Priority Data

Mar. 31, 2009  (JP) .................. 2009-087257

(51) Int. Cl.
*H01M 4/88* (2006.01)
*H01M 4/40* (2006.01)
*H01M 4/131* (2010.01)
*H01M 4/1391* (2010.01)
*H01M 4/505* (2010.01)

(52) U.S. Cl.
CPC ............... *H01M 4/405* (2013.01); *H01M 4/40* (2013.01); *H01M 4/131* (2013.01); *H01M 4/1391* (2013.01); *H01M 4/505* (2013.01)
USPC .............. 429/231.95; 252/182.1; 252/518.1; 252/521.4; 423/594.15; 423/594.16; 423/599; 423/600

(58) Field of Classification Search
CPC ..... H01M 4/131; H01M 4/1391; H01M 4/40; H01M 4/405; H01M 4/505; H01M 2004/02
USPC ........... 429/231.95; 423/594.15, 594.16, 599, 423/600; 252/182.1, 518.1, 521.4
See application file for complete search history.

(56) References Cited

U.S. PATENT DOCUMENTS

| | | | |
|---|---|---|---|
| 6,814,894 B2 | 11/2004 | Shoji et al. | |
| 7,988,880 B2 | 8/2011 | Kumada et al. | |
| 2002/0119372 A1* | 8/2002 | Zhang | 429/218.1 |
| 2002/0158233 A1* | 10/2002 | Shoji et al. | 252/500 |

FOREIGN PATENT DOCUMENTS

| | | |
|---|---|---|
| EP | 1233001 A2 | 8/2002 |
| JP | 11045710 A | 2/1999 |

(Continued)

*Primary Examiner* — Basia Ridley
*Assistant Examiner* — James Erwin
(74) *Attorney, Agent, or Firm* — The Webb Law Firm

(57) ABSTRACT

With the object of providing a positive electrode active material for lithium battery that can increase the filling density, can increase the output characteristics, and furthermore, with a small voltage decrease during conservation at high temperature in a charged state, a positive electrode active material for lithium battery is proposed, containing a spinel type (Fd3-m) lithium transition metal oxide represented by general formula $Li_{1+x}M_{2-x}O_{4-\delta}$ (where M represents a transition metal including Mn, Al and Mg, x represents 0.01 to 0.08 and $0 \le \delta$) and a boron compound, the inter-the atomic distance Li—O of the spinel type lithium transition metal oxide being 1.971 Å to 2.006 Å, and the amount of magnetic substance measured for the positive electrode active material for lithium battery being 600 ppb or less.

5 Claims, 3 Drawing Sheets

(56) References Cited

FOREIGN PATENT DOCUMENTS

| | | | |
|---|---|---|---|
| JP | 11171551 A | 6/1999 | |
| JP | 2002033101 A | 1/2002 | |
| JP | 2002042812 A | 2/2002 | |
| JP | 2002316823 A | 10/2002 | |
| JP | 2003238162 A | 8/2003 | |
| JP | 2010073370 A | 4/2010 | |
| WO | 2009054436 A1 | 4/2009 | |

* cited by examiner

POSITIVE ELECTRODE ACTIVE MATERIAL FOR LITHIUM BATTERY

TECHNICAL FIELD

The present invention is related to a positive electrode active material for lithium battery, which can be used as a positive electrode active material for a lithium battery, and which, in particular, can be used suitably as a positive electrode active material of a battery that equips an electric tool called a power tool, an electric vehicle (EV: Electric Vehicle), a hybrid electric vehicle (HEV: Hybrid Electric Vehicle) or the like.

TECHNICAL BACKGROUND

Lithium batteries, in particular lithium secondary batteries, having such characteristics as a large energy density and a long life span, are used widely as power sources for home appliances such as video cameras and portable electronic devices such as notebook personal computers and mobile phones, electric tools such as power tools, and the like, and recently have been put into application in large batteries that equip an electric vehicle (EV), a hybrid electric vehicle (HEV) and the like.

A lithium secondary battery is a secondary battery having a structure in which, during charging, lithium melts out from the positive electrode as an ion and moves towards the negative electrode to be stored and conversely, during discharging, the lithium ion returns from the negative electrode to the positive electrode, and it is known that the high energy density of the battery has its source in the electric potential of the positive electrode material.

In addition to lithium transition metal oxides such as $LiCoO_2$, $LiNiO_2$ and $LiMnO_2$ having a layer structure, lithium transition metal oxides (in the present invention, referred to as "spinel type lithium transition metal oxides" or "LMOs") having a spinel structure (Fd3-m) of the manganese series such as $LiMn_2O_4$ and $LiNi_{0.5}Mn_{1.5}O_4$ are known as positive electrode active materials for lithium secondary batteries of this species.

Owing to low raw material costs and the absence of toxicity, which renders it safe, further more, having properties being strong against over-charging, there is a focus on the spinel type lithium transition metal oxide (LMO) of the manganese series as a next-generation positive electrode active material for a large battery for an electric vehicle (EV), a hybrid electric vehicle (HEV) and the like. In addition, a spinel type lithium transition metal oxide (LMO), which allows for insertion and desorption of Li ions three-dimensionally, has excellent output characteristics, compared to a lithium transition metal oxide such as $LiCoO_2$, which has a layer structure, such that utilization in applications requiring excellent output characteristics such as tools called power tools, EV and HEV batteries and the like, are anticipated, and additional improvement of output characteristics are intended.

As a spinet type lithium transition metal oxide (LMO) with improved output characteristics, in prior art, a lithium manganese composite oxide represented by the composition formula $Li_{1+x}Mn_{2-x}O_{u-y}F_y$ (where $0.02 \leq x$, $0.1 \leq y \leq u$, $3 \leq (2u-y-1-x)/(2-x) \leq 4$ and $3.9 \leq u \leq 4.1$) having a mean particle diameter in the range of 1 to 20 μm is described in Patent Reference 1.

In addition, an Li—Mn series spinel compound represented by the composition formula $Li_{1+x}Mn_{2-x-y}Mg_yO_4$ ($x=0.03$ to $0.15$, $y=0.005$ to $0.05$) having a specific surface area of 0.5 to 0.8 $m^2/g$ and a sodium content of 1000 ppm or less is described in Patent Reference 2.

Since a spinel type lithium transition metal oxide (LMO) has a small filling density compared to a lithium transition metal oxide such as $LiCoO_2$, which has a layer structure, it has the problem that the discharge capacity per volume is low.

Therefore, for instance, Patent Document 3, or the like, describes a technique, which, by adding an element of an oxide which melting point is 800° C. or lower, for instance boron (B) and firing, promotes the generation and growth of crystals of spinel type lithium transition metal oxide (LMO), that is to say, promotes sintering of micro-particles which are assembled crystal particles, and elevates the filling density (tap density) as compact micro-particles.

PRIOR ART DOCUMENTS

Patent Documents

[Patent Document 1] Japanese Patent Application Laid-open No. H11-045710
[Patent Document 2] Japanese Patent Application Laid-open No. 2002-033101
[Patent Document 3] Japanese Patent Application Laid-open No. H11-171551

SUMMARY OF THE INVENTION

Problems to be Solved by the Invention

Development of a positive electrode active substance allowing the battery output to be higher is demanded of batteries equipping an electric vehicle (EV) or a hybrid vehicle (HEV), compared to batteries for consumer products such as video cameras, notebook personal computers and mobile phones. However, as described above, if generation and growth of crystals are promoted by adding boron (B) or the like when firing a spinel type lithium transition metal oxide (LMO), micro-particles (also referred to "primary particle") crystal particles have aggregated become large, such that, while it is possible to increase the filling density (tap density), there is the problem that the output becomes more difficult to obtain.

Meanwhile, reliability during long-term conservation, in particular, small voltage decrease during conservation at high temperature in a charged state are demanded of batteries equipping EVs and HEVs.

Consequently, the present invention provides a novel positive electrode active material for lithium battery in which the filling density (tap density) can be increased, at the same time, the output characteristics can be increased, and furthermore, the voltage decrease during high temperature charge conservation is small.

Means to Solve the Problems

The present invention proposes a positive electrode active material for lithium battery, which is a positive electrode active material for lithium battery containing a spinel type (Fd3-m) lithium transition metal oxide represented by general formula $Li_{1+x}M_{2-x}O_{4-\delta}$ (where M represents a transition metal including Mn, Al and Mg, x represents 0.01 to 0.08 and $0 \leq \delta$) and a boron compound, the spinel type (Fd3-m) lithium transition metal oxide having an inter-atomic distance Li—O of 1.971 Å to 2.006 Å as measured by the Rietveld method using the fundamental method, and the amount of magnetic substance measured for the positive electrode active material for lithium battery by the measurement method described below being 600 ppb or less.

The amount of magnetic substance can be determined by using a 500 cc lidded resinous container, adding 500 cc of ion-exchanged water and one cylindrical stirring bar-type magnet covered with tetrafluoroethylene (a magnet which range of magnetic force falls within 100 mT to 150 mT when the magnetic force is measured using TESLA METER Model TM-601 by KANETEC) to 100 g of positive electrode active substance material (powder), which is placed on a ball mill rotating stage, and rotating to produce a slurry; next, taking the magnet out, immersing it in ion-exchanged water and eliminating excess powder attached to the magnet with an ultrasound cleaner; next taking the magnet out, immersing it in aqua regia, heating at 80° C. for 30 minutes in aqua regia to dissolve magnetic substances, analyzing aqua regia in which magnetic substance has dissolved for the amounts of iron, nickel, chromium and zinc with ICP Atomic Emission Spectrometer, and, with the total amounts thereof as the amount of magnetic substance, calculating the amount of magnetic substance per weight of positive electrode active substance material.

Compared to a spinel type lithium transition metal oxide that does not contain a boron compound, the positive electrode active material for lithium battery of the present invention becomes compact micro-particles as a result of sintering of micro-particles being promoted, allowing the filling density (tap density) to be increased along with allowing the discharge capacity at high-load discharge (3 C) to be increased. In addition, when a boron compound is added and a spinel type lithium transition metal oxide is fired, since sintering is promoted leading to specific surface areas becoming small, in general, output characteristics become difficult to obtain; however, in the case of the present invention, by defining the inter-atomic distance Li—O to a predetermined range, the entering/exiting of Li ions are facilitated, allowing the output characteristics to be increased.

In addition, defining the amount of magnetic substance detected by a predetermined measurement method can render micro-short-circuits (voltage drops) unlikely to occur. In particular, it is possible to prevent short circuits (voltage drops) in a state of being maintained at a high temperature for a long time period still in a charged state.

Thus, if the positive electrode active material for lithium battery of the present invention is used as a positive electrode active substance material of a lithium battery, since the discharge capacity at high-load discharge (3 C) is high, moreover, a high output can be obtained, and furthermore, voltage decrease during conservation at high temperature in a charged state is small, it can be used as a positive electrode active substance of batteries used in, for instance, notebook personal computer, mobile phones, cordless phone handsets, video movies, liquid crystal televisions, electric shavers, portable radio, headphone stereo, backup power source, pace maker, hearing aid and the like. Among them, use is possible particularly suitably as a positive electrode active substance of batteries that equip Evs, HEVs and the like.

MODE FOR CARRYING OUT THE INVENTION

Figure 1:
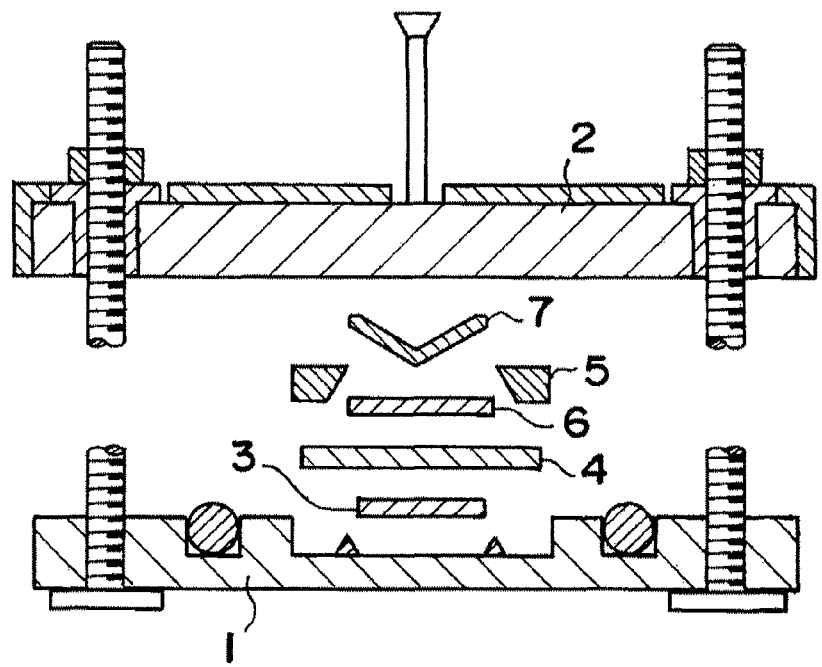
FIG. 1 Figure showing the constitution of an electrochemical cell fabricated in order to evaluate the battery characteristics of samples obtained in the examples, reference examples, and reference comparative examples.

Hereafter, embodiments of the present invention will be described. However, the scope of the present invention is not to be limited to the embodiments described below.

[Present Positive Electrode Active Substance Material]

The positive electrode active material for lithium battery of the present embodiment (hereinafter referred to "the present positive electrode active substance material") is a powder containing a spinel type (Fd3-m) lithium transition metal oxide (hereinafter referred to as "the present LMO") and a boron compound, and the amount of magnetic substance measured by a predetermined method is in a predetermined range.

In the present invention, unless expressly stated otherwise, "contains" implies the meaning of allowing other constituents to be contained to such an extent that the functions of the main constituent cannot be prevented. Although not to specify the proportional content of the main constituent, occupying at least 50 percent in mass or more, in particular 70 percent in mass or more, of which 90 percent in mass or more, of which 95 percent in mass or more (including 100%) is desirable.

For instance, the present positive electrode active substance material may contain as impurities $SO_4$ if 1.5 percent in weight or less and other elements if 0.5 percent in weight or less each. This is due to the thought that amounts in such extent have almost no influence on the capability of the present positive electrode active substance material.

<The Present LMO>

The present LMO is a spinel type (Fd3-m) lithium transition metal oxide represented by the general formula (1) $Li_{1+x}M_{2-x}O_{4-\delta}$ (where M represents a transition metal including Mn, Al and Mg, x represents 0.01 to 0.08 and $0 \leq \delta$), in which the inter-atomic distance Li—O is 1.971 Å to 2.006 Å as measured by the Rietveld method using the fundamental method.

It is desirable that the present LMO is a lithium transition metal oxide represented by general formula (2) $Li(Li_xMg_y Al_zMn_{2-x-y-z})O_{4-\delta}$ (where, $0.01 \leq x \leq 0.08$, $0.02 \leq y \leq 0.07$, $0.06 \leq z \leq 0.14$ and $0 \leq \delta$).

In the general formula (2) it is desirable that "x" is 0.01 to 0.08, of which 0.01 to 0.05, and in particular 0.01 to 0.03 are more desirable.

In addition, it is desirable that "y" is 0.02 to 0.07, of which 0.02 to 0.06, and in particular 0.02 to 0.04 are more desirable.

In addition, it is desirable that "z" is 0.06 to 0.14, of which 0.07 to 0.13, and in particular 0.11 to 0.13 are more desirable.

Note that, since those with a spinel structure in general contain oxygen deficiency, the atomic ratio of oxygen in the general formula (2) may have more or less of non-stoichiometry (4−δ (0≤δ)), or a portion of the oxygen may be substituted with fluorine.

(Inter-Atomic Distance Li—O)

The inter-atomic distance Li—O as defined in the present LMO is the distance between the nearest-neighboring sites having a value that is measured by the Rietveld method using the fundamental method.

In the present LMO, it is important that the inter-atomic distance Li—O is 1.971 Å to 2.006 Å as measured by the Rietveld method using the fundamental method. Defining the inter-atomic distance Li—O to be 1.971 Å to 2.006 Å allows the output characteristics to be increased significantly when using the LMO as a positive electrode active material of a lithium secondary battery. From this point of view, the inter-atomic distance Li—O of 1.971 Å to 2.004 Å is more desirable, in particular 1.978 Å to 2.004 Å is even more desirable, of which in particular 1.978 Å to 1.990 Å is more desirable.

(Inter-Atomic Distance Mn—O)

The inter-atomic distance Mn—O as defined in the present LMO is the distance between the nearest-neighboring sites having a value that is measured by the Rietveld method using the fundamental method.

In the present LMO, it is desirable that the inter-atomic distance Mn—O as measured by the Rietveld method using the fundamental method is 1.932 Å to 1.948 Å, and in particular 1.933 Å to 1.945 Å, of which in particular 1.940 Å to 1.945 Å are desirable. Controlling the inter-atomic distance Mn—O to 1.932 Å to 1.948 Å, allows the output characteristics to be increased more significantly when using the LMO as a positive electrode active material of a lithium secondary battery.

(Crystallite Size)

It is desirable that the crystallite size of the present LMO is 500 nm to 2000 nm, in particular, 750 nm to 1750 nm is more desirable, of which 1000 nm to 1750 nm is all the more desirable.

By defining the crystallite size of the present LMO to 500 nm to 2,000 nm, the number of boundary surfaces within the primary particles can be decreased, increasing the discharge capacity at high-load discharge (3 C).

To adjust the crystallite size in this way, in addition to controlling the firing temperature, adjustment by adding a boron compound and firing is also possible.

Here, "crystallite" means the maximum group deemed a single crystal, which can be determined by XRD measurements and performing a Rietveld analysis.

Constituted by a plurality of crystallites, the smallest unit particle surrounded by a grain boundary when observed by SEM (for instance 3,000×) is called a "primary particle" in the present invention. Thus, included in the primary particles are single crystals and polycrystals.

In addition, a particle, which comprises a plurality of primary particles aggregated by each sharing a portion of the outer perimeter (grain boundary) and is isolated from other particles, is called a "secondary particle" or an "aggregated particle", in the present invention. Incidentally, the laser diffraction/scattering particle size distribution measurement method is a measurement method that calculates a particle size by considering an aggregated particle as one particle (aggregated particle), and the average particle size (D50) means the particle size at 50% cumulative volume, that is to say, the size at 50% accumulation from the fine side of the cumulative percentage representation of the particle size measurement value converted into volume in a chart of volume-based particle size distribution.

Note that, the Li—O distance of the spinel type lithium transition metal oxide in the initial state can be determined by measuring the Li—O distance in the spinel type lithium transition metal oxide after use as a positive electrode active material of a battery, that is to say, after charge-discharge.

To measure the Li—O distance of the spinel type lithium transition metal oxide after charge-discharge, it suffices to disassemble the battery and take out the spinel type lithium transition metal oxide, then, prepare a spinel type lithium transition metal oxide in a discharged state down to 3.0 V in counter electrode lithium equivalents, seal it in a polyethylene bag under argon atmosphere, and measure the Li—O distance with a measurement range of 30 to 120° for the XRD diffraction angle 2θ. In so doing, the reason for measuring at 30° or greater is because this is a region where there are diffraction peaks of conducting materials and binder, affecting the diffraction intensities of spinel type lithium transition metal oxide.

It is known that the Li—O distance of a spinel type lithium transition metal oxide measured after charge-discharge in this way decreases approximately 0.1 Ångströms compared to the initial state. Thus, the Li—O distance of the spinel type lithium transition metal oxide in the initial state can be determined by taking this decreasing fraction into account.

<Boron Compound>

The present positive electrode active substance material is one that contains a boron compound along with the present LMO. Compared to an LMO that does not contain a boron compound, a powder containing a boron compound along with the present LMO in this way allows the filling density (tap density) to be increased along with allowing the discharge capacity at high-load discharge (3 C) to be increased. That is to say, when firing a spinel type lithium transition metal oxide, adding a boron compound and firing can promote sintering of micro-particles which are assembled crystal particles of spinel type lithium transition metal oxide (LMO), allowing compact aggregated micro-particles (secondary particles) to be formed, such that the filling density (tap density) can be increased. At the same time, since the generation and growth of crystals of spinel type lithium transition metal oxide (LMO) can be promoted, the crystallite size of the spinel type lithium transition metal oxide can be increased, allowing the discharge capacity at high-load discharge (3 C) to be increased by decreasing the number of boundary surfaces in the primary particle.

In addition, if a spinel type lithium transition metal oxide is fired after a boron compound has been added, sintering is promoted and the specific surface area decreases, such that in general, obtaining an output becomes difficult; however, in the case of the present invention, by defining the inter-atomic distance Li—O to be in a given range, the output characteristics can be increased by facilitating the entry and exit of Li ions.

In so doing, it suffices that the boron compound is a compound containing boron (B element). Although it is thought that a boron compound added prior to firing is altered morphologically by firing, it is difficult to specify accurately the morphology thereof. However, as is verified in the following examples, from the fact that the boron (B element) exists in a state that is eluted by water, it has been verified that the B element is not a spinel constitutive element and is present outside the spinel as a boron compound in some form. Consequently, boron (B element) is not present in the spinel, and there is also no clear concentration gradient of boron (B element) on the surface and inside of the crystal particles.

Since a boron compound fulfills the role of promoting the sintering of spinel type lithium transition metal oxide (LMO)

when firing spinel type lithium transition metal oxide as described above by adding a boron compound and firing, it is thought that other substances having the same effects, that is to say, substances having a melting point at the firing temperature or lower, for instance compounds such as vanadium compound ($V_2O_5$), antimony compound ($Sb_2O_3$) and phosphorus compound ($P_2O_5$), allow the same effects to be obtained.

<Amount of Magnetic Substance>

In the present positive electrode active substance material, it is important that the amount of magnetic substance measured by a predetermined method is 600 ppb or less. That is to say, it is important from the point of view of producing a battery in which a voltage decrease during conservation at high temperature in a charged state is unlikely to occur, that the amount of magnetic substance is 600 ppb or less. Although it is desirable that the lower limit value of the amount of magnetic substance is zero, since, realistically, it is extremely difficult to reach 0 ppb, taking feasibility into consideration, 0<amount of magnetic substance≤600, concretely, 5 ppb to 600 ppb is desirable. However, then the costs of removal is considered, it is desirable to adjust further to a range of 10 ppb to 600 ppb or 20 ppb to 500 ppb.

Note that measuring the amount of magnetic substance can also serves as determination of the presence or the absence of occurrence of equipment trouble.

The amount of magnetic substance is a value measured by a method such as the following:

That is to say, the amount of magnetic substance can be determined by using a 500 cc lidded resinous container, adding 500 cc of ion-exchanged water and one cylindrical stirring bar-type magnet covered with tetrafluoroethylene (a magnet which range of magnetic force falls within 100 mT to 150 mT when the magnetic force is measured using TESLA METER Model TM-601 by KANETEC) to 100 g of positive electrode active substance material (powder), which is placed on a ball mill rotating stage, and rotating to produce a slurry; next, taking the magnet out, immersing it in ion-exchanged water and eliminating excess powder attached to the magnet with an ultrasound cleaner; next taking the magnet out, immersing it in aqua regia, heating at 80° C. for 30 minutes in aqua regia to dissolve magnetic substances, analyzing aqua regia in which magnetic substance has dissolved for the amounts of iron, nickel, chromium and zinc with an ICP Atomic Emission Spectrometer, and, with the total amounts thereof as the amount of magnetic substance, calculating the amount of magnetic substance per weight of positive electrode active substance material.

The above measurement method is a method whereby the magnetic substance attached to the magnet is dissolved in acid to quantify the amount of magnetic substance, by referring to JIS G 1258:1999.

Since the magnetic substance attached to the magnet is in tiny amounts, it is necessary to immerse the magnetic substance along with the magnet into the acidic solution for acid dissolution. Thus, a magnet covered with tetrafluoroethylene is used as the magnet, and the strength of each magnet is measured prior to the measurements.

Note that, even for the same species of magnets commercialized as magnets having a magnetic force of, for instance, 130 mT, the magnetic force of a magnet is known to have a measurement value that shifts within a range of on the order of 100 mT to 150 mT, when the magnetic force is measured using TESLA METER Model TM-601 by KANETEC. Meanwhile, since it has been verified that with a magnet which magnetic force is within a range of on the order of 100 mT to 150 mT as measured in this way, the amount of magnetic substance defined by the present invention becomes similar, in the present invention, the magnetic force of a magnet in the method for measuring the amount of magnetic substance is defined with a range of 100 mT to 150 mT.

<Average Particle Size of Primary Particle>

It is desirable that the average particle size of the primary particle of the present positive electrode active substance material is 0.5 µm to 5.0 µm, in particular 0.7 µm to 4.0 µm, of which in particular 1.0 µm to 3.0 µm is desirable.

The average particle size of the primary particle can be determined by observation at 20 kV acceleration voltage and 3,000× magnification using a scanning electron microscope (HITACHI S-3500N) and calculating the primary particle image on the electron micrograph using a image analysis software (Analysis FIVE manufactured by OLYMPUS).

<Morphology of Secondary Particle>

As morphology of the secondary particle of the present positive electrode active substance material, those containing aggregated particles (secondary particles) that are aggregated roundly are desirable. Including such aggregated particles (secondary particles) that are aggregated roundly improves fluidity as a powder, allowing coatablility as an active substance to be improved.

For instance, preparation is possible so as to include aggregated particles (secondary particles) that are aggregated roundly by performing granulation treatment using a heat spray dryer (spray dryer) and then firing. However, there is no limitation to such a method.

<Particle Size Distribution>

It is desirable that the average particle size (D50) of the present positive electrode active substance material as determined by laser diffraction/scattering particle size distribution measurement method is 10.0 µm to 23.0 µm, in particular 13.0 µm to 22.0 µm, of which in particular 13.0 µm to 21.0 µm is desirable.

It is desirable that the 10% cumulative size (D10) of the present positive electrode active substance material as determined by the laser diffraction/scattering particle size distribution measurement method is 6.0 µm to 12.0 µm, in particular 6.0 µm to 10.0 µm, of which in particular 7.0 µm to 9.0 µm is desirable.

Adjusting the 10% cumulative size (D10) to 6.0 µm to 12.0 µm, that is to say, enlarging the particle size of the fine powder to a range of 6.0 µm to 12.0 µm, allows the life span characteristics of the battery to be increased.

To adjust D10 in this way, it is possible for instance by performing granulation treatment using a heat spray dryer (spray dryer) prior to firing. However, there is no limitation to such a method.

It is desirable that the 90% cumulative size (D90) of the present positive electrode active substance material as determined by the laser diffraction/scattering particle size distribution measurement method is 10.0 µm to 40.0 µm, in particular 20.0 µm to 35.0 µm, of which in particular 25.0 µm to 35.0 µm is desirable.

Adjusting the 90% cumulative size (D90) to 10.0 µm to 40.0 µm, that is to say, adjusting finely the particle size of the coarse powder to a range of 10.0 µm to 40.0 µm, can eliminate coarse foreign substance particles present on the outside of the crystals of positive electrode active substance, in particular metal coarse foreign substance particles such as of iron, nickel chromium and zinc, allowing the occurrence of micro-short-circuits to be suppressed. Thus, when a battery is constructed with the present Li transition metal oxide as the positive electrode active substance, it is possible to prevent the coarse foreign substance particles from eluting from the positive electrode, becoming segregated and depositing over the negative electrode, piercing the separator and short-circuiting internally.

Note that, it has been verified that even if an impurity is present on the inside of the crystal of positive electrode active substance, there is no influence on the occurrence of micro-short-circuits, and the thinking of adjusting D90 to 10.0 µm to 40.0 µm and eliminating coarse foreign substance particles present on the outside of the crystal of positive electrode active substance to prevent the occurrence of micro-short-circuits, is entirely different from the thinking of reducing the so-called total iron amount.

It is desirable that the maximum particle size (Dmax) of the present positive electrode active substance material as determined by the laser diffraction/scattering particle size distribution measurement method is 50.0 µm to 100.0 µm, in particular 60.0 µm to 90.0 µm, of which in particular 70.0 µm to 80.0 µm is desirable. Adjusting to such ranges can prevent coarse particles from piercing the separator and short-circuiting internally.

It is desirable that the specific surface area (CS) of the present positive electrode active substance material as determined by the laser diffraction/scattering particle size distribution measurement method is 0.30 $m^2$/cc to 0.70 $m^2$/cc, in particular 0.40 $m^2$/cc to 0.60 $m^2$/cc, of which in particular 0.45 $m^2$/cc to 0.55 $m^2$/cc is desirable. Adjusting to such ranges allows the high temperature cycle characteristics to be satisfactory.

<Tap Density>

The tap density can be 1.0 to 1.9 $g/cm^3$ for the present positive electrode active substance material. In particular 1.4 to 1.9 $g/cm^3$, of which in particular 1.6 to 1.8 $g/cm^3$ are more desirable.

Although in general the tap density (filling density) is small for a spinel type lithium transition metal oxide (LMO) compared to lithium transition metal oxides such as $LiCoO_2$ having a layer structure, the filling density (tap density) can be increased by adding boron (B) and firing, allowing the tap density to be adjusted to the tap density of the range described above.

<Specific Surface Area>

It is desirable that the specific surface area of the present positive electrode active substance material is 0.1 $m^2$/g to 0.8 $m^2$/g, in particular 0.1 $m^2$/g to 0.6 $m^2$/g, of which in particular 0.1 $m^2$/g to 0.4 $m^2$/g, among which in particular 0.15 $m^2$/g to 0.4 $m^2$/g is more desirable.

Controlling the specific surface area of the present positive electrode active substance material to 0.8 $m^2$/g or less allows the elution amount of Mn to be reduced, and by controlling the specific surface area to 0.1 $m^2$/g or greater allows the capacity to be maintained.

The specific surface area can be measured by the well known BET specific surface area measurement method which uses the nitrogen adsorption method.

<Production Method>

Next, production method for the present positive electrode active substance material will be described.

As one means for adjusting the inter-atomic distance Li—O of the present LMO to be 1.971 Å to 2.006 Å, a method may be cited, whereby a designated manganese raw material is used, and at firing, the proportion between the atmosphere contact surface area and the filling volume of lithium manganate raw materials is adjusted suitably. However, there is no limitation to this method.

As the given manganese raw material described above, it is desirable to use an electrolytic manganese dioxide (manganese dioxide obtained by electrolysis) having a proportion of weight loss when heated from 200° C. to 400° C. (referred to as "TG diminution amount"; TG diminution amount=(weight at 200° C. heating−weight at 400° C. heating)×100/weight prior to heating) of 2.7 percent in mass or more. It is thought that if the TG diminution amount is large, the volume of the pore portion from where the structural waters were removed increases, increasing the amount of infiltrating lithium compound, thereby increasing reactivity.

In addition, as concrete means for adjusting suitably the proportion between the atmosphere contact surface area and the lithium manganate raw materials filling volume at firing, methods that allow the proportion between the atmosphere contact surface area and the lithium manganate raw materials filling volume to be adjusted, for instance, by adjusting the apparent density of the mixture raw materials, by adjusting the filling amount of firing raw materials such as changing the filling height of the firing raw materials with respect to the open surface area of the firing container, or by changing the shape of the firing container and the like, may be cited.

In addition, the rate of rise in firing temperature also influences the Li—O inter-atomic distance. Since with a sudden temperature rise, carbon dioxide due to the thermal decomposition of lithium carbonate is removed from specific locations, the reaction becomes heterogeneous, preventing the desired Li—O inter-atomic distance to be obtained, it is desirable to find an optimal rate of firing temperature increase.

Note that adjustment means other than those mentioned above are not excluded.

Meanwhile, in order to adjust the amount of magnetic substance of the present positive electrode active substance material to a predetermined range, it is important to sort by magnetic force (also referred to as "magnetic separation") the fired and then ground positive electrode active substance material powder by a predetermined method, and preferably, it is adequate to carry out magnetic force sorting for the manganese raw material, which is the raw material, by a predetermined method.

In so doing, as a method for sorting by magnetic force the positive electrode active substance material powder or the manganese raw material, it is desirable to use, for instance, a magnetic force sorter provided with a constitution in which rod-shaped magnets having a magnetic force of 4,000 gauss to 8,000 gauss are disposed parallelly leaving intervals of 10 mm to 40 mm, and several stages of these are stacked above and below, load the manganese raw material or the positive electrode active substance material powder at a loading speed of 0.5 kg/min to 3 kg/min and sort by magnetic force.

In so doing, it is more desirable to load the positive electrode active substance material powder or the manganese raw material and sort by magnetic force in such a way that the ratio of surface area of magnet over the magnetic force sorting distance in the up/down direction is 500 $mm^2$/mm to 1,500 $mm^2$/mm.

Note that the magnetic force sorting distance in the up/down direction is the up/down distance of the space where the magnets are disposed in the magnetic force sorting device.

As the production step of the present positive electrode active substance material, for instance, mixing lithium raw material, the manganese raw material, magnesium raw material, aluminum raw material and boron compound, doing wet grinding, then, granulating and drying, firing, as necessary sorting, further as necessary heat-treating, further as necessary sorting, and then sorting by magnetic force as described above, is desirable.

Here, the lithium raw materials are not limited in particular and, for instance, lithium hydroxide (LiOH), lithium carbonate ($Li_2CO_3$), lithium nitrate ($LiNO_3$), $LiOH \cdot H_2O$, lithium oxide (Li$_2$O), other fatty acid lithium and lithium halides, and the like, may be cited. Among these, hydroxide salt, carbonic acid salt and nitric acid salt of lithium are desirable.

As for magnesium raw materials, there is no particular limitation and, for instance, magnesium oxide (MgO), magnesium hydroxide (Mg(OH)$_2$), magnesium fluoride (MgF$_2$), magnesium nitrate (Mg(NO$_3$)$_2$) and the like, may be used, among which magnesium oxide is desirable.

As for aluminum raw materials, there is no particular limitation. For instance, aluminum hydroxide (Al(OH)$_3$), aluminum fluoride (AlF$_3$) and the like may be used, among which aluminum hydroxide is desirable.

As the boron compound, it is desirable to use boric acid or lithium borate. As the lithium borate, for instance, those having various morphologies can be used, such as lithium metaborate (LiBO$_2$), lithium tetraborate (Li$_2$B$_4$O$_7$), lithium pentaborate (LiB$_5$O$_8$) and lithium perborate (Li$_2$B$_2$O$_5$), among which lithium tetraborate (Li$_2$B$_4$O$_7$) is desirable. This B element does not become a solid solute in the spinel, and provides the action of promoting sintering of the spinel in the firing process.

Adjusting the amount of boron compound added in a range that is greater than 0 percent in mass of the spinel type lithium transition metal as boron (B) element but not more than 0.3 percent in mass, in particular 0.0001 to 0.2 percent in mass, of which 0.01 to 0.18 percent in mass is desirable.

For mixing the raw materials, there is no particular limitation regarding the method therefor as long as the mixing is homogeneous. For instance, it suffices to use a well known mixing machine such as a mixer, add each source simultaneously or in a suitable sequence and stir-mix wet or dry. In the case of wet mixing, it is desirable to add liquid media such as water and dispersant, wet-mix to obtain a slurry and grind the obtained slurry with a wet-grinding machine. In particular, it is desirable to grind to submicron order. After grinding to submicron order, performing granulation and firing can increase the homogeneity of each particle prior to firing reaction, allowing the reactivity to be increased.

It is desirable that the raw materials mixed as described above are granulated to a given size and then fired.

As long as the various raw materials that were ground in the previous step do not separate and are dispersed in the granulation particles, the granulation method may be wet or dry, extrusion granulation method, tumbling granulation method, fluidized bed granulation method, mixing granulation method, spray drying granulation method, compression molding granulation method, or flake granulation method using a roll or the like. However, if wet granulation is performed, drying thoroughly prior to firing is necessary. As far as drying methods, it suffices to dry by a well known method such as spray heat drying method, hot air drying method, vacuum drying method and freeze-drying method, among which spray heat drying method is desirable. It is desirable to perform spray heat drying method using a heat spray dryer (spray dryer). Granulating with a heat spray dryer (spray dryer) not only allows the particle size distribution to be sharper but also allows the form of the secondary particle to be adjusted so as to contain aggregated particles (secondary particles) that aggregated spherically.

It suffices that firing is carried out in a firing furnace under air atmosphere, under oxygen gas atmosphere, under an atmosphere with the oxygen partial pressure adjusted, or under carbon dioxide gas atmosphere, or under other atmosphere.

As firing conditions, raising the temperature at a rate of temperature increase of 50 to 200° C./hr and firing so as to maintain a temperature of 760 to 870° C. (meaning the temperature when a thermocouple is brought into contact with the firing object inside the firing furnace) for 0.5 to 30 hours is desirable.

There is no particular limitation on the type of firing furnace. For instance rotary kiln, stationary furnace and other firing furnaces can be used to perform firing.

As described above, since adjusting the shape of the firing container, the proportion of the amount of firing raw materials to fill with relative to the mouth surface area (open surface area) of the firing container, and the like, can alter the inter-atomic distance Li—O, it is desirable to adjust these so as to be within the given range of inter-atomic distance.

Sorting after firing has the technical meaning of adjusting the particle size distribution of the aggregated powder along with the elimination of foreign substances, and sorting in the range of 1 μm to 75 μm average particle size (D50) is desirable.

Then, it suffices that the powder obtained in this way is sorted by magnetic force as described above.

<Characteristics/Application>

The present positive electrode active substance material, after being crushed/sorted as necessary, can be used effectively as a positive electrode active substance of a lithium battery.

For instance, a positive electrode mixture can be prepared by mixing the present positive electrode active substance material, a conductor comprising carbon black or the like and a binder comprising Teflon (registered trade mark) binder or the like. Then, such a positive electrode mixture can be used for the positive electrode, a material capable of storing and releasing lithium, such as, for instance, lithium or carbon, can be used for the negative electrode, and a lithium salt such as lithium hexafluophosphate (LiPF6) dissolved in a mixed solvent such as ethylenecarbonate-dimethylcarbonate can be used for the non-aqueous electrolyte to construct a lithium secondary battery. However, limitation to a battery with such a constitution is not meant.

Since the present positive electrode active substance material, compared to conventional LMOs and the like, has a high filling density (tap density), moreover, high output and discharge capacity at high-load discharge (3 C), and furthermore, a small voltage decrease during conservation at high temperature in a charged state, it can be used as a positive electrode active substance of batteries used in, for instance, notebook personal computer, mobile phones, cordless phone handsets, video movies, liquid crystal televisions, electric shavers, portable radio, headphone stereo, backup power source, pace maker, hearing aid and the like, and in addition, it can be used suitably as positive electrode active substance of batteries equipping power tools, EVs, HEVs and the like, of which particularly output characteristics are demanded.

Among them, since a lithium battery provided with the present positive electrode active substance material as the positive electrode active material exerts both excellent life characteristics (cycle life characteristics) and output characteristics when used by repeating charge-discharge in the central region of the depth of charge-discharge (for instance 50-80% SOC), it is particularly excellent for applications in positive electrode active material of large lithium batteries, in particular, for use as power sources to drive motors that equip electric vehicles (EVs) and hybrid electric vehicles (HEVs).

Note that an HEV is a vehicle that combines the use of two sources of driving forces: an electric motor and an internal combustion engine.

In addition, "lithium battery" is meant to include all batteries containing lithium or lithium ion inside the battery, such as lithium primary battery, lithium secondary battery, lithium ion secondary battery and lithium polymer battery.

[Explanation of Expressions]

In the present Specification, when the expression "X to Y" (X and Y are any numbers) is used, unless explicitly mentioned otherwise, the meaning of "X or greater but Y or lower" is included and at the same time the meaning of "preferably greater than X" or "preferably less than Y" is included.

In addition, the expression "X or greater" (X is any number) or "Y or less" (Y is any number) includes the intention to the effect of "greater than X is desirable" or "less than Y is desirable".

EXAMPLES

In the following, the present invention will be described further based on examples; however, the present invention is not to be limited to the examples indicated below.

<Measurements of the Inter-Atomic Distances Li—O and Mn—O and the Crystallite Size>

For the samples (powders), the inter-atomic distances Li—O and Mn—O and the crystallite size were measured by the Rietveld method using the fundamental method described in the following.

The Rietveld method using the fundamental method is a method whereby the structural parameters of a crystal are refined from the diffraction intensities obtained by powder x-ray diffraction or the like. It is a method in which a crystal structure model is hypothesized, and various parameters of this crystal structure are refined in such a way that the x-ray diffraction pattern derived by calculations from this structure matches as much as possible the actually measured x-ray diffraction pattern.

An x-ray diffractometer (D8 ADVANCE, manufactured by Bruker AXS) using a Cu-Kα beam was used for the measurements of x-ray diffraction patterns. Among the x-ray diffraction patterns obtained from the range of diffraction angle 2θ=10 to 120°, eight peaks with strong intensities were analyzed using an analysis software (product name: Topas Version 3) to determine the inter-atomic distances Li—O and Mn—O and the crystallite size.

Note that, it was hypothesized that the crystal structure belonged to the cubic crystal from the space group Fd3-m (Origin Choice2), and that Li was occupying the 8a site thereof, Mn, Mg, Al and an extra Li fraction x the 16d site, and O at 32e, site occupancy and atom displacement parameter Beq. of oxygen were fixed to 1, and with the fractional coordinates of oxygen serving as variables and watching for the indices representing the extent of the match between the observed intensities and the calculated intensities Rwp<8.0 and GOF<2.0, the calculation was performed repeatedly until they converged, as shown in the table. Note that the crystallite size was analyzed using the Lorentz function without introducing distortion in the calculation.

The instrument specifications, conditions and the like that were used for other measurements and Rietveld method analyses were as follows:

Detector: PSD
Detector Type: VANTEC-1
High Voltage: 5616 V
Discr. Lower Level: 0.35 V
Discr. Window Width: 0.15 V
Grid Lower Level: 0.075 V
Grid Window Width: 0.524 V
Flood Field Correction: Disabled
Primary radius: 250 mm
Secondary radius: 250 mm
Receiving slit width: 0.1436626 mm
Divergence angle: 0.3°
Filament Length: 12 mm
Sample Length: 25 mm
Receiving Slit Length: 12 mm
Primary Sollers: 2.623°
Secondary Sollers: 2.623°
Lorentzian, 1/Cos: 0.01630098 Th <Measurements of Mean Particle Diameter (D50), 10% and 90% Cumulative Diameters (D10 and D90), Dmax and CS>

The particle size distributions of the samples (powders) were measured as follows:

Using a sample circulator ("Microtrac ASVR" manufactured by Nikkiso Co. Ltd.) for laser diffraction particle size distribution meter, sample (powder) was introduced in water, while at a flow rate of 40 mL/sec, 40 watts ultrasound was emitted for 360 seconds, then, the particle size distribution was measured using a laser diffraction particle size distribution meter "HRA (X100)" manufactured by Nikkiso Co. Ltd. to determine D50, D10, D90, $D_{max}$ and CS (specific surface area) from the obtained chart of volumetric standard particle size distribution.

Note that when measuring, water passed through a 60 µm filter was used for the aqueous solvent, the solvent refractive index was 1.33, the particle transparency condition was reflective, the measurement range was 0.122 to 704.0 µm, the measurement time was 30 seconds and the mean value from two measurements was used as the measurement value.

<Measurement of the Specific Surface Area (BET Method)>

The specific surface areas of the samples (powders) were measured as described below.

First, 0.5 g of sample (powder) was weighed in a glass cell for MONOSORB LOOP (manufactured by Yuasa Ionics Inc., product name: MS-18), a specific surface area measurement device by the flow gas adsorption method, the interior of the glass cell was substituted with nitrogen gas for 5 minutes with a gas amount of 30 mL/min in a pretreatment device for the MONOSORB LOOP, and then heat treatment was carried out at 250° C. for 10 minutes in the above nitrogen gas atmosphere. Thereafter, the sample (powder) was measured by the BET one point method using the MONOSORB LOOP.

Note that the adsorption gas used during the measurement was a mixed gas of 30% nitrogen:70% helium.

<Measurement of Tap Density>

50 g of sample (powder) was introduced into a 150 ml glass measuring cylinder, and a vibrating specific gravity meter (KRS-409 manufactured by Kuramochi Kagaku Kikai Seisakusho) was used to determine the powder filling density when tapped 540 times with a stroke of 60 mm.

<Measurement of the Amount of Magnetic Substance>

Performed by adopting a method whereby samples (powders) obtained in the examples and comparative examples are turned into slurry along with a magnet covered with tetrafluoroethylene being introduced in the slurry to attach the magnetic substance onto the magnet, then, the magnetic substance is dissolved in acid to quantify the magnetic substance attached to the magnet, by referring to JIS G 1258:1999. A detailed description is given next.

Note that, since the magnetic substance attached to the magnet is in tiny amounts, it is necessary to immerse the magnetic substance along with the magnet into the acidic solution for acid dissolution. Thus, a magnet covered with tetrafluoroethylene was used as the magnet, and the strength of each magnet was measured prior to the measurements. The strength of the magnet was measured using TESLA METER Model TM-601 manufactured by KANETEC.

100 g of lithium transition metal oxide powder (sample), 500 cc of ion-exchanged water and one magnet which is a cylindrical stirring bar-type magnet covered with tetrafluoroethylene (magnetic force measured using TESLA METER Model TM-601 manufactured by KANETEC: 132 mT) were introduced into a 500 cc lidded resinous container, this was placed on a ball mill rotating stage and rotated at a pre-adjusted rotation speed of 60 rpm for 30 minutes to produce a slurry. Next, the magnet was taken out, introduced into a 100 mL beaker to be immersed in ion-exchanged water, the magnet was washed for 3 minutes with an ultrasound cleaner (Model US-205 manufactured by SND Co., Ltd.) with the output switching set to two frequencies to eliminate excess powder attached to the magnet. Exchange of ion-exchanged water in which the magnet was immersed and washing with ultrasound were repeated eight times. Thereafter, the magnet was taken out, placed in a 50 mL measuring cylinder, immersed in an amount of aqua regia (liquid in which concentrated hydrochloric acid and concentrated nitric acid are mixed at a volume ratio of 3:1) that submerges the magnet completely, and heated in aqua regia at 80° C. for 30 minutes to dissolve the magnetic substances. The magnet was taken out from the aqua regia, the aqua regia in which magnetic substances were dissolved was diluted with ion-exchanged water. The diluted aqua regia was analyzed for the amounts of iron, nickel, chromium and zinc with an ICP Atomic Emission Spectrometer, and, with the total amounts thereof as the amount of magnetic substance, the amount of magnetic substance per weight of positive electrode active substance material was calculated.

<Battery Evaluation>

(Battery Fabrication)

Li battery evaluation was carried out by the following method.

A paste was prepared by weighing accurately 8.80 g of positive electrode active material, 0.60 g of acetylene black (manufactured by Denki Kagaku Kogyo) and 5.0 g of a solution of 12 percent in weight PVDF (manufactured by Kishida Kagaku) dissolved in NMP (N-methylpyrrolidone), adding thereto 5 ml of NMP and mixing thoroughly. This paste was placed above an aluminum foil which serves as a collector, coated with an applicator adjusted to a gap of 250 μm and turned into a film, vacuum-dried overnight at 120° C., then, punched with 16 mmϕ and compressed by pressing at 4 t/cm² to be turned into a positive electrode. Immediately prior to battery fabrication, the adsorbed moisture was eliminated by vacuum drying at 120° C. for 120 min or longer, and fitted into the battery. In addition, the mean value of the weights of the 16 mmϕ aluminum foils was pre-determined, the weight of the aluminum foil was subtracted from the weight of the positive electrode to determine the weight of the positive electrode mixture; in addition, the content in the positive electrode active material was determined from the mixing ratios of the positive electrode active material, acetylene black and PVDF.

The negative electrode was a 20 mmϕ×1.0 mm thick metallic Li, and these materials were used to fabricate TOMCELL (registered trade mark), a cell for electrochemical evaluation, shown in FIG. 1.

The electrochemistry cell of FIG. 1 had, positioned at the inner center of a lower body 1 made of organic electrolytic solution-resistant stainless steel, a positive electrode 3 comprising the positive electrode mixture. A separator 4 made of microporous polypropylene resin impregnated with an electrolytic solution was placed on the top surface of this positive electrode 3, and the separator was secured with a Teflon spacer 5. In addition, on the top surface of the separator, a negative electrode 6 comprising metallic Li was placed at the bottom, a spacer 7 overlaid with a negative terminal was placed, and from above, this was covered with an upper body 2, which was fastened with screws to seal the battery.

The electrolytic solution used was one in which EC and DMC mixed at 3:7 in volume served as a solvent, into which μmoL/L LiPF6 was dissolved as solute.

(Evaluation of Output Characteristics)

The electrochemical cell prepared as described above was used to determine the output characteristics by the methods described below.

At 20° C., in a state charged to 50% SOC at 0.1 C, values for the currents so as to have discharge rates of 0.1 C, 1.0 C, 3.0 C, 5.0 C and 7.0 C were calculated from the contents of the positive electrode active materials in the positive electrodes, a current-voltage figure was constructed, plotting the 10-second voltage when discharging a constant current at the respective rates, which was extrapolated by the least square method to determine the current $I_{3.0}$ corresponding to 3.0 V, the output was calculated from the formula below and indicated as a relative value when the value of comparative example 1 was taken as 100.

$$W = V \times I_{3.0}$$

where

W: output (W)

V: discharge lower limit voltage 3.0 (V)

$I_{3.0}$: current (A) corresponding to 3.0 V (Evaluation of High-Temperature Cycle Life Characteristics)

The electrochemical cell prepared as described above was used to test charging-discharging and determine the high-temperature cycle life characteristics by the methods described below.

A cell was placed in an environment tester which was set in such a way that the ambient temperature at which the battery is charged-discharged was at 45° C., the cell was prepared so it could be charged-discharged, left for four hours so that the cell temperature reaches the ambient temperature, then, two cycles of charge-discharge were performed at 0.1 C with the charge-discharge range of 3.0 V to 4.3 V, then, with a charge-discharge depth of 50-80% SOC, charge-discharge cycle was performed 47 times at 1 C, and for the 50th cycle, in order to verify the capacity, charge-discharge was performed at 0.1 C with a charge-discharge range of 3.0 V to 4.3 V.

The percentage (%) of the value determined by dividing the discharge capacity at the 50th cycle by the discharge capacity at the 2nd cycle served as the value for high-temperature cycle life characteristics and was indicated as a relative value when the value of reference comparative example 3 was taken as 100.

(3 C Rate Discharge Capacity)

The electrochemical cell prepared as described above was used to determine 3 C rate discharge capacity by the methods described below.

First, at a temperature of 20 degrees, 2 cycles of charge-discharge were performed at 0.1 C with a charge-discharge range of 3.0 V to 4.3 V. Next, constant current charging at 0.1 C was performed to 4.3 V, and a constant current discharging at 3.0 C was performed to 3.0 V. This measured discharge capacity (mAh/g) served as the 3 C rate discharge capacity. Note that the charge-discharge rate and discharge capacity were calculated from the amount of positive electrode active material in the positive electrode.

(Voltage Drop Verification Test)

The cell for electrochemical evaluation "TOMCELL (registered trade mark)" created as described above was used to perform the voltage drop verification test.

At 25° C., charge-discharge was repeated twice with the electrode potential in the range of 3.0 to 4.3 V. Next, charge was carried out to 80% with respect to the discharge capacity of the second cycle (SOC=80%), and after taking the battery out from the device, the electric potential was measured. Then, batteries in such charged states were placed in a 65° C. thermostatic chamber and conserved for 30 days. Thereafter, the electric potential after 30 days was measured, the assessment being "defective" for those with an electric potential drop of 200 mV or greater and "good" for those with an electric potential drop of less than 200 mV, and the rate of defectiveness was determined among 100 units.

Examples 1-4

Magnetic force sorting ("raw material magnetic separation" in Table 1) to electrolytic manganese dioxide (contains 0.03 percent in mass Mg; TG diminution amount during 200° C.-400° C. heating: 3.0%) was carried out as indicated in Table 1, whereby using the magnetic force sorter described below which the ratio of the surface area of the magnet with respect to the magnetic force sorting distance in the up/down direction is adjusted to fall in the range of 800 mm$^2$/mm to 900 mm$^2$/mm, and introducing manganese raw material at an introduction speed of 1.0 kg/min.

So as to obtain the composition indicated in Table 1, lithium carbonate, electrolytic manganese dioxide, magnesium oxide and aluminum hydroxide, furthermore, with respect to the total weight thereof, 0.4 percent in weight of lithium borate ($Li_2B_4O_7$) and water were mixed and stirred to prepare slurry with a solid content concentration of 25 percent in weight.

To the obtained slurry (10 kg raw material powder), an ammonium salt of polycarboxylic acid (SN dispersant 5468, manufactured by San Nopco Limited) was added as a dispersant at 3.5 percent in weight with respect to the slurry solid content, which was ground with a wet grinder at 1000 rpm for 20 minutes to obtain a mean particle diameter (D50) of 0.7 µm.

Next, the obtained ground slurry was granulated and dried using a heat spray dryer (spray dryer OC-16, manufactured by Ohkawara Kakohki Co., Ltd). In so doing, granulation-drying was carried out using a rotating disc for spraying, at 24,000 rpm rotation speed, 7.6 kg/hr slurry supply amount, and adjusting the temperature so that the drying tower exit temperature was 155° C.

The interior of a firing container (crucible made of alumina, size=length*width*height=10*10*5 (cm)) was filled with the obtained granulated powder in such a way that the ratio between the open surface area and the filling height (open surface area cm$^2$/filling height cm) was 100.

Then, using a stationary electric furnace, as shown in Table 1, the temperature was raised at the rate of rise in temperature=150° C./hr from ordinary temperature to the set firing temperature, retained at the firing temperature (retention temperature) indicated in Table 1 for 14 hours, thereafter, the temperature was decreased at the rate of decrease in temperature=20° C./hr from the retention temperature to 600° C., and thereafter cooling to ordinary temperature was let to take place spontaneously. Note that the temperature fluctuation during the retention time was controlled within the range of ±5° C.

The fired powder obtained by firing was crushed with a mortar, sorted with a sieve having 63 µm openings, and by introducing the powder under the sieve using the magnetic force sorter described below with the ratio of the surface area of the magnet with respect to the magnetic separation distance in the up/down direction adjusted to fall in the range of 800 mm$^2$/mm to 900 mm$^2$/mm, at an introduction speed of 1.0 kg/min, magnetic force sorting indicated in Table 1 ("magnetic separation after firing" in Table 1) was carried out to obtain a sample.

A magnetic force sorter provided with a constitution in which rod-shaped magnets with round-cross section having a magnetic force of 5,000 gauss disposed parallelly leaving intervals of 30 mm and four stages of these were stacked above and below was used for the magnetic force sorter used for magnetic force sorting of electrolytic manganese dioxide and fired powder.

The magnetic force sorting distance in the up/down direction of this magnetic force sorter was 180 mm.

When the obtained sample was analyzed by ICP by removing impurities such as $SO_4$, it was determined that the composition was that shown in Table 1. The boron content was 0.1 percent in weight of the sample. In addition, the inter-atomic distance Li—O ("Li—O"), the crystallite size and the amount of magnetic substance of the obtained sample are indicated in Table 1, at the same time as the results of voltage drop verification test and output characteristic evaluation are indicated in Table 1.

As an indicator of the probability of the analysis results, the values of Rwp and GOF, which indicate the extent of correspondence between the measured intensity and the calculated intensity, are shown in Table 2.

Example 5

Magnetic force sorting of electrolytic manganese dioxide (contains 0.03 percent in mass Mg; TG diminution amount during 200° C.-400° C. heating: 3.0%) was not carried out.

So as to obtain the composition indicated in Table 1, lithium carbonate, electrolytic manganese dioxide, magnesium oxide and aluminum hydroxide, furthermore, with respect to the total weight thereof, 0.4 percent in weight of lithium borate ($Li_2B_4O_7$) and water were mixed and stirred to prepare a slurry with a solid content concentration of 25 percent in weight.

Thereafter, a sample was obtained similarly to Example 3.

When the obtained sample was analyzed by ICP by removing impurities such as $SO_4$, it was determined that the composition was that shown in Table 1. The boron content was 0.1 percent in weight of the sample. In addition, the inter-atomic distance Li—O ("Li—O"), the crystallite size and the amount of magnetic substance of the obtained sample are indicated in Table 1, at the same time as the results of voltage drop verification test and output characteristic evaluation are indicated in Table 1.

As an indicator of the probability of the analysis results, the values of Rwp and GOF, which indicate the extent of correspondence between the measured intensity and the calculated intensity, are shown in Table 2.

Comparative Example 1

A sample was obtained similarly to Example 1 except for the point that magnetic separation was not performed for electrolytic manganese dioxide and after firing, and the point that the firing temperature was 760° C.

When the obtained sample was analyzed by ICP by removing impurities such as $SO_4$, it was determined that the composition was that shown in Table 1. The boron content was 0.1 percent in weight of the sample. In addition, the inter-atomic distance Li—O ("Li—O"), the crystallite size and the amount of magnetic substance of the obtained sample are indicated in Table 1, at the same time as the results of voltage drop verification test and output characteristic evaluation are indicated in Table 1.

As an indicator of the probability of the analysis results, the values of Rwp and GOF, which indicate the extent of correspondence between the measured intensity and the calculated intensity, are shown in Table 2.

Comparative Example 2

Magnetic force sorting of electrolytic manganese dioxide (contains 0.03 percent in mass Mg; TG diminution amount during 200° C.-400° C. heating: 3.0%) was not carried out.

So as to obtain the composition indicated in Table 1, lithium carbonate, electrolytic manganese dioxide, magnesium oxide and aluminum hydroxide, furthermore, with respect to the total weight thereof, 0.4 percent in weight of lithium borate ($Li_2B_4O_7$) and water were mixed and stirred to prepare a slurry with a solid content concentration of 25 percent in weight.

To the obtained slurry (10 kg raw material powder), an ammonium salt of polycarboxylic acid (SN dispersant 5468, manufactured by San Nopco Limited) was added as a dispersant at 3.5 percent in weight with respect to the slurry solid content, which was ground with a wet grinder at 1000 rpm for 20 minutes to obtain a mean particle diameter (D50) of 0.7 μm Next, the obtained ground slurry was granulated and dried using a heat spray dryer (spray dryer OC-16, manufactured by Ohkawara Kakohki Co., Ltd). In so doing, granulation-drying was carried out using a rotating disc for spraying, at 24,000 rpm rotation speed, 7.6 kg/hr slurry supply amount, and adjusting the temperature so that the drying tower exit temperature was 155° C.

The interior of a firing container (crucible made of alumina, size=length*width*height=10*10*5 (cm)) was filled with the obtained granulated powder in such a way that the ratio between the open surface area and the filling height (open surface area $cm^2$/filling height cm) was 100.

Then, using a stationary electric furnace, as shown in Table 1, the temperature was raised at the rate of rise in temperature=150° C./hr from ordinary temperature to the set firing temperature, retained at the firing temperature (retention temperature) indicated in Table 1 for 14 hours, thereafter, the temperature was decreased at the rate of decrease in temperature=20° C./hr from the retention temperature to 600° C., and thereafter cooling to ordinary temperature was let to take place spontaneously. Note that the temperature fluctuation during the retention time was controlled within the range of ±5° C.

The fired powder obtained by firing was crushed with a mortar, sorted with a sieve having 63 μm openings, and by introducing the powder under the sieve using the same magnetic force sorter as Example 1 with the ratio of the surface area of the magnet with respect to the magnetic separation distance in the up/down direction adjusted to fall in the range of 800 $mm^2$/mm to 900 $mm^2$/mm, at an introduction speed of 1.0 kg/min, magnetic force sorting indicated in Table 1 ("magnetic separation after firing" in Table 1) was carried out to obtain a sample.

When the obtained sample was analyzed by ICP by removing impurities such as $SO_4$, it was determined that the composition was that shown in Table 1. The boron content was 0.1 percent in weight of the sample. In addition, the inter-atomic distance Li—O ("Li—O"), the crystallite size and the amount of magnetic substance of the obtained sample are indicated in Table 1, at the same time as the results of voltage drop verification test and output characteristic evaluation are indicated in Table 1.

As an indicator of the probability of the analysis results, the values of Rwp and GOF, which indicate the extent of correspondence between the measured intensity and the calculated intensity, are shown in Table 2.

Comparative Example 3

Magnetic force sorting of electrolytic manganese dioxide (contains 0.03 percent in mass Mg; TG diminution amount during 200° C.-400° C. heating: 3.0%) was not carried out.

In addition, so as to obtain the composition indicated in Table 1, lithium carbonate, electrolytic manganese dioxide and magnesium oxide, furthermore, with respect to the total weight thereof, 0.2 percent in weight of lithium borate ($Li_2B_4O_7$) and water were mixed and stirred to prepare a slurry with a solid content concentration of 25 percent in weight.

From here on, a sample was obtained similarly to Comparative example 1 except that the firing temperature was changed to 715° C.

When the obtained sample was analyzed by ICP by removing impurities such as $SO_4$, it was determined that the composition was that shown in Table 1. The boron content was 0.05 percent in weight of the sample. In addition, the inter-atomic distance Li—O ("Li—O"), the crystallite size and the amount of magnetic substance of the obtained sample are indicated in Table 1, at the same time as the results of voltage drop verification test and output characteristic evaluation are indicated in Table 1.

As an indicator of the probability of the analysis results, the values of Rwp and GOF, which indicate the extent of correspondence between the measured intensity and the calculated intensity, are shown in Table 2.

TABLE 1

| | Composition | Boron content (wt %) | Firing temperature (° C.) | Raw material magnetic separation | | | Magnetic separation after firing | | |
|---|---|---|---|---|---|---|---|---|---|
| | | | | Magnetic force(G) | Number of magnetic separations (times) | Processing speed (kg/min) | Magnetic force(G) | Number of magnetic separations (times) | Processing speed (kg/min) |
| Example 1 | $Li_{1.03}Mn_{1.82}Mg_{0.03}Al_{0.12}O_4$ | 0.1 | 870 | 5000 | 3 | 1 | 5000 | 3 | 1 |
| Example 2 | $Li_{1.03}Mn_{1.82}Mg_{0.03}Al_{0.12}O_4$ | 0.1 | 840 | 5000 | 2 | 1 | 5000 | 2 | 1 |
| Example 3 | $Li_{1.03}Mn_{1.82}Mg_{0.03}Al_{0.12}O_4$ | 0.1 | 790 | 5000 | 2 | 1 | 5000 | 2 | 1 |
| Example 4 | $Li_{1.01}Mn_{1.84}Mg_{0.03}Al_{0.12}O_4$ | 0.1 | 790 | 5000 | 2 | 1 | 5000 | 1 | 1 |
| Example 5 | $Li_{1.03}Mn_{1.82}Mg_{0.06}Al_{0.08}O_4$ | 0.1 | 790 | — | — | — | 5000 | 2 | 1 |

TABLE 1-continued

| | | | | | | | | |
|---|---|---|---|---|---|---|---|---|
| Comparative example 1 | $Li_{1.03}Mn_{1.82}Mg_{0.03}Al_{0.12}O_4$ | 0.1 | 760 | — | — | — | — | — |
| Comparative example 2 | $Li_{1.03}Mn_{1.82}Mg_{0.03}Al_{0.12}O_4$ | 0.1 | 800 | — | — | — | 3000 | 1 | 1 |
| Comparative example 3 | $Li_{1.03}Mn_{1.95}Mg_{0.02}O_4$ | 0.05 | 715 | — | — | — | — | — |

| | Evaluation | | | | |
|---|---|---|---|---|---|
| | Physical properties | | | Battery performance | |
| | Amount of magnetic substances(ppb) | Crystallite size(nm) | Li—O (Å) | Voltage drop(rate of incidence of defects %) | Output (%) |
| Example 1 | 30 | 1378 | 1.986 | 0 | 107 |
| Example 2 | 115 | 1145 | 1.994 | 0 | 105 |
| Example 3 | 131 | 834 | 2.004 | 0 | 103 |
| Example 4 | 248 | 1435 | 1.992 | 0 | 102 |
| Example 5 | 475 | 1083 | 1.995 | 0 | 105 |
| Comparative example 1 | 890 | 775 | 2.007 | 4 | 100 |
| Comparative example 2 | 700 | 830 | 2.002 | 2 | 102 |
| Comparative example 3 | 2300 | 151 | 2.023 | 10 | 93 |

TABLE 2

| | Rwp | GOF |
|---|---|---|
| Example 1 | 3.2 | 1.1 |
| Example 2 | 3.2 | 1.1 |
| Example 3 | 3.5 | 1.2 |
| Example 4 | 5.7 | 1.5 |
| Example 5 | 3.5 | 1.2 |
| Comparative example 1 | 3.8 | 1.3 |
| Comparative example 2 | 4.0 | 1.4 |
| Comparative example 3 | 3.9 | 1.3 |

(Results/Discussion)

Regarding the samples obtained in Examples 1-5, when the state of the presence of boron (B) was checked by the following tests, it was found that boron (B) did not constitute a spinel. That is to say, when the samples obtained in Examples 1-5 were immersed in water and stirred, it was determined that boron (B) eluted into water. In addition, when the lattice constants were measured with an XRD measurement apparatus and compared for samples before and after immersion in water, since no significant difference was observed in the lattice constants before and after immersion, the spinel structure was found to be unaltered. Thus, it was demonstrated that the boron (B) in the samples obtained in Example 1-5 did not constitute a spinel and was not present within the spinel structure.

From the results of Table 1, it was found that voltage decrease during conservation at high temperature in a charged state could be limited by reducing the amount of magnetic substance detected by the measurement method described above. More concretely, it was found that the rate of incidence of defects during conservation at high temperature in a charged state could be limited to less than 2% by bringing the amount of magnetic substance to 600 ppb or less.

REFERENCE EXAMPLES

Although the reference examples described below are ones with an amount of magnetic substance outside the range of the present invention due to the powder under the sieve obtained by sorting after firing not being sorted by magnetic force, the relationship between the inter-atomic distance Li—O and the output characteristics, the relationship between the crystallite size and the high-temperature cycle life span characteristics, as well as the relationship between the point of containing a boron compound and the filling density (tap density) and the discharge capacity at high-load discharge (3 C), and the like, are thought to be similar also for the positive electrode active material for lithium battery of the present invention from the standpoint of production method, composition as well as physical properties and the like. Thus, the present invention incorporates these observations.

Reference Example 1

Lithium carbonate, electrolytic manganese dioxide (Contains 0.03 percent in mass Mg; TG diminution amount during 200° C.-400° C. heating: 3.0%), magnesium oxide and aluminum hydroxide were weighed as indicated in Table 1, and these were mixed to obtain a mixed raw material.

The interior of a firing container (crucible made of alumina, size=length*width*height=10*10*5 (cm)) was filled with the obtained mixed raw material in such a way that the ratio between the open surface area and the filling height (open surface area $cm^2$/filling height cm) was 100. In so doing, the raw material apparent density was 1.1 $g/cm^3$.

Then, using a stationary electric furnace, as shown in Table 3, the temperature was raised at the rate of rise in temperature=150° C./hr from ordinary temperature to the set firing temperature, retained at a firing temperature (retention temperature) of 825° C. for 20 hours, thereafter, the temperature was decreased at the rate of decrease in temperature=20° C./hr from the retention temperature to 600° C., and thereafter cooling to ordinary temperature was let to take place spontaneously. Note that the temperature fluctuation during the retention time was controlled within the range of 815° C. to 835° C.

The fired powder obtained by firing was crushed with a mortar and sorted with a sieve having 75 μm openings, and the powder under the sieve was obtained as a sample.

When the obtained sample was analyzed by ICP by removing impurities such as $SO_4$, it was determined that the composition was that shown in Table 4. In addition, the inter-atomic distances Li—O and Mn—O ("Li—O" "Mn—O"), the crystallite size and the specific surface area (SSA) of the obtained sample are indicated in Table 4, at the same time as the results of output characteristic evaluation ("output") and high temperature cycle life span characteristics evaluation ("high temperature cycle") are indicated in Table 4.

Note that, as an indicator of the probability of the analysis results, the values of Rwp and GOF, which indicate the extent of correspondence between the measured intensity and the calculated intensity, are shown in Table 6.

Reference Examples 2 to 9, Reference Comparative Examples 1 to 4

A sample was obtained in a similar manner to Reference example 1, except that the mixing amount of each raw material, the ratio between the open surface area and the filling height (open surface area cm²/filling height cm) and the firing temperature, (retention temperature) were changed as indicated in Table 1.

The composition by ICP analysis, the inter-atomic distances Li—O and Mn—O ("Li—O" "Mn—O"), the crystallite size, the specific surface area (SSA), results of output characteristics evaluation ("output") and the results of high temperature cycle life span characteristics evaluation ("high temperature cycle") of the obtained sample are shown in Table 4.

Reference Example 10

As indicated in Table 3, lithium carbonate, electrolytic manganese dioxide (Contains 0.03 percent in mass Mg; TG diminution amount during 200° C.-400° C. heating: 3.0%), magnesium oxide and aluminum hydroxide, furthermore, with respect to the total weight thereof, 0.4 percent in weight of lithium borate ($Li_2B_4O_7$) and water were mixed and stirred to prepare a slurry with a solid content concentration of 25 percent in weight.

To the obtained slurry (10 kg raw material powder), an ammonium salt of polycarboxylic acid (SN dispersant 5468, manufactured by San Nopco Limited) was added as a dispersant at 3.5 percent in weight with respect to the slurry solid content, which was ground with a wet grinder at 1000 rpm for 20 minutes to obtain a mean particle diameter (D50) of 0.7 μm.

Next, the obtained ground slurry was granulated and dried using a heat spray dryer (spray dryer OC-16, manufactured by Ohkawara Kakohki Co., Ltd). In so doing, granulation-drying was carried out using a rotating disc for spraying, at 24,000 rpm rotation speed, 7.6 kg/hr slurry supply amount, and adjusting the temperature so that the drying tower exit temperature was 155° C.

The interior of a firing container (crucible made of alumina, size=length*width*height=10*10*5 (cm)) was filled with the obtained granulated powder in such a way that the ratio between the open surface area and the filling height (open surface area cm²/filling height cm) was 100.

Then, using a stationary electric furnace, as shown in Table 3, the temperature was raised at the rate of rise in temperature=150° C./hr from ordinary temperature to the set firing temperature, retained at a firing temperature (retention temperature) of 790° C. for 14 hours, thereafter, the temperature was decreased at the rate of decrease in temperature=20° C./hr from the retention temperature to 600° C., and thereafter cooling to ordinary temperature was let to take place spontaneously. Note that the temperature fluctuation during the retention time was controlled within the range of 780° C. to 800° C.

The fired powder obtained by firing was crushed with a mortar and sorted with a sieve having 63 μm openings, and the powder under the sieve was obtained as a sample.

When the obtained sample was analyzed by ICP by removing impurities such as $SO_4$, it was determined that the composition was that shown in Table 4. The B amount was 0.1 percent in weight with respect to the lithium manganate having the composition in Table 4. In addition, the inter-atomic distances Li—O and Mn—O ("Li—O" "Mn—O"), the crystallite size and the specific surface area (SSA) of the obtained sample are indicated in Table 4, at the same time as the results of output characteristics evaluation ("output"), high temperature cycle life span characteristics evaluation ("high temperature cycle") and 3 C rate discharge capacity are shown in Table 5.

As an indicator of the probability of the analysis results, the values of Rwp and GOF, which indicate the extent of correspondence between the measured intensity and the calculated intensity, are shown in Table 6.

Figure 6:
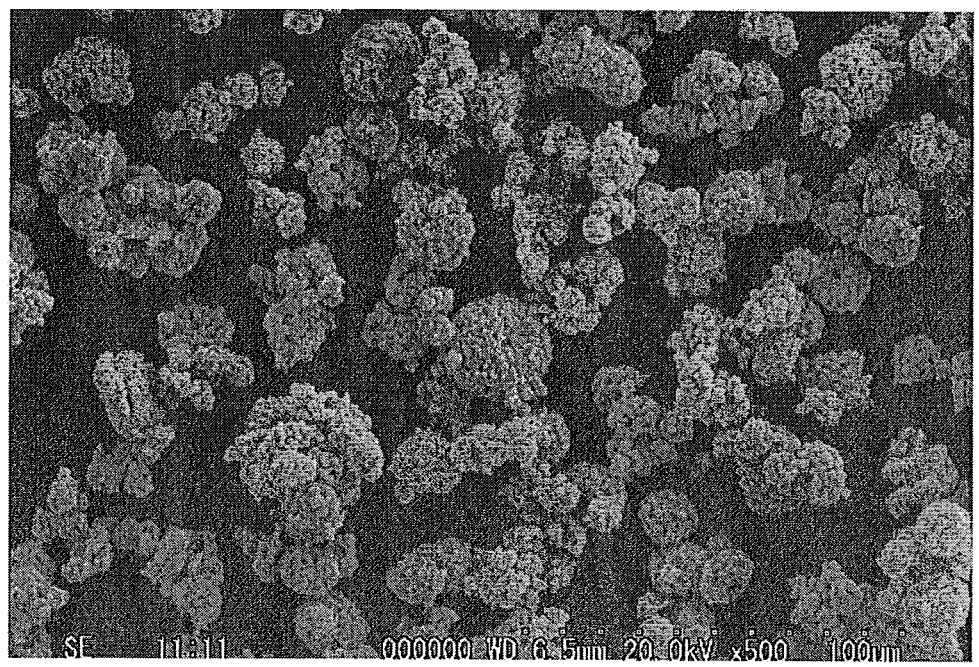
FIG. 6 SEM photograph of the sample obtained in Reference Example 10.

In addition, when the sample obtained in Reference example 10 was observed on an SEM photograph, as shown in FIG. 6, it was determined to contain aggregated particles (secondary particles) which were aggregated roundly, although not all the aggregated particles (secondary particles) were.

Further in addition, when the state of presence of boron (B) was checked for the sample obtained in Reference example 10 by the following tests, it was revealed that boron (B) did not constituting a spinel. That is to say, when the sample obtained in Reference example 10 was immersed in water and stirred, it was determined that boron (B) eluted into water. In addition, when the lattice constants were measured with an XRD measurement apparatus and compared for a sample before and after immersion in water, since no significant difference was observed in the lattice constants before and after immersion, the spinel structure was found to be unaltered. Thus, it was demonstrated that the boron (B) in the sample obtained in Reference example 10 did not constitute a spinel and was not present within the spinel structure.

Reference Comparative Example 6

Manganese dioxide (surface area: 80 m²/g), lithium carbonate and aluminum hydroxide were weighed and mixed so as to obtain a molar ratio of Li:Mn:Al=1.05:1.90:0.10, then, to this mixture, 0.2 percent in weight of lithium borate ($Li_2B_4O_7$) was added, mixed with a ball mill, fired in an electric furnace at 750° C. and crushed to generate a lithium-manganese series composite oxide, which was obtained as a sample.

|  | Weight | | | | Open surface area (cm²)/filling height (cm) | Rate of temperature increase °C./hr | Firing temperature °C. |
| --- | --- | --- | --- | --- | --- | --- | --- |
|  | Li₂CO₃ | MnO₂ | MgO | Al(OH)₃ | | | |
| Reference Example 1 | 20.13 | 84.46 | 0.66 | 4.76 | 100 | 150 | 825 |
| Reference Example 2 | 20.13 | 84.46 | 0.66 | 4.76 | 100 | 150 | 850 |
| Reference Example 3 | 20.13 | 84.46 | 0.66 | 4.76 | 100 | 150 | 875 |
| Reference Example 4 | 20.13 | 84.46 | 0.66 | 4.76 | 100 | 150 | 900 |
| Reference Example 5 | 20.23 | 85.37 | 1.29 | 3.11 | 100 | 150 | 825 |
| Reference Example 6 | 20.23 | 85.37 | 1.29 | 3.11 | 100 | 150 | 850 |
| Reference Example 7 | 20.23 | 85.37 | 1.29 | 3.11 | 100 | 150 | 875 |
| Reference Example 8 | 20.23 | 85.37 | 1.29 | 3.11 | 100 | 150 | 900 |
| Reference Example 9 | 20.13 | 84.46 | 0.66 | 4.76 | 100 | 150 | 815 |
| Reference Comparative Example 1 | 20.02 | 83.99 | 0.00 | 5.99 | 60 | 150 | 875 |
| Reference Comparative Example 2 | 20.02 | 83.99 | 0.00 | 5.99 | 60 | 150 | 900 |
| Reference Comparative Example 3 | 20.13 | 84.46 | 0.66 | 4.76 | 60 | 150 | 825 |
| Reference Comparative Example 4 | 20.13 | 84.46 | 0.66 | 4.76 | 60 | 150 | 900 |
| Reference Example 10 | 1797.8 | 7714.0 | 57.5 | 430.7 | 100 | 150 | 790 |
| Reference Comparative Example 6 | 20.08 | 85.98 | 0.0 | 3.94 | 100 | 150 | 750 |

|  | Composition | | | | Li—O Å | Mn—O Å | Crystallite size nm | SSA M²/g | Output % | High-temperature cycle % |
| --- | --- | --- | --- | --- | --- | --- | --- | --- | --- | --- |
|  | Li | Mn | Mg | Al | | | | | | |
| Reference Example 1 | 1.02 | 1.83 | 0.03 | 0.12 | 2.004 | 1.933 | 129 | 0.90 | 102 | 103 |
| Reference Example 2 | 1.02 | 1.83 | 0.03 | 0.12 | 2.003 | 1.933 | 161 | 0.72 | 105 | 103 |
| Reference Example 3 | 1.02 | 1.83 | 0.03 | 0.12 | 1.998 | 1.935 | 220 | 0.58 | 105 | 113 |
| Reference Example 4 | 1.02 | 1.83 | 0.03 | 0.12 | 1.990 | 1.937 | 356 | 0.42 | 106 | 112 |
| Reference Example 5 | 1.02 | 1.84 | 0.06 | 0.08 | 1.999 | 1.936 | 151 | 1.08 | 103 | 101 |
| Reference Example 6 | 1.02 | 1.84 | 0.06 | 0.08 | 1.990 | 1.940 | 206 | 0.79 | 108 | 106 |
| Reference Example 7 | 1.02 | 1.84 | 0.06 | 0.08 | 1.990 | 1.940 | 311 | 0.50 | 112 | 110 |
| Reference Example 8 | 1.02 | 1.84 | 0.06 | 0.08 | 1.978 | 1.945 | 490 | 0.38 | 113 | 102 |
| Reference Example 9 | 1.02 | 1.83 | 0.03 | 0.12 | 2.006 | 1.933 | 126 | 0.90 | 102 | 100 |
| Reference Comparative Example 1 | 1.02 | 1.83 | 0.00 | 0.15 | 2.010 | 1.931 | 169 | 0.60 | 95 | 100 |
| Reference Comparative Example 2 | 1.02 | 1.83 | 0.00 | 0.15 | 2.008 | 1.930 | 248 | 0.44 | 95 | 95 |
| Reference Comparative Example 3 | 1.02 | 1.83 | 0.03 | 0.12 | 2.008 | 1.931 | 82 | 1.05 | 100 | 100 |

-continued

|  | Composition | | | | Li—O | Mn—O | Crystallite size | SSA | Output | High-temperature cycle |
|---|---|---|---|---|---|---|---|---|---|---|
|  | Li | Mn | Mg | Al | Å | Å | nm | M²/g | % | % |
| Reference Comparative Example 4 | 1.02 | 1.83 | 0.03 | 0.12 | 1.970 | 1.949 | 370 | 0.38 | 95 | 100 |

TABLE 5

|  | Composition | | | | Li—O | Mn—O | Crystallite size | SSA | Tap density |
|---|---|---|---|---|---|---|---|---|---|
|  | Li | Mn | Mg | Al | Å | Å | mn | M²/g | g/cc |
| Reference Example 10 | 1.01 | 1.840 | 0.03 | 0.12 | 1.992 | 1.938 | 1435 | 0.31 | 1.67 |
| Reference Comparative Example 6 | 1.03 | 1.870 | 0.00 | 0.10 | 2.031 | 1.921 | 148 | 0.32 | 1.92 |

|  | D10 μm | D50 μm | D90 μm | Dmax μm | CS μm | Output % | High-temperature cycle % | 3 C rate discharge capacity mAh/g |
|---|---|---|---|---|---|---|---|---|
| Reference Example 10 | 9.8 | 19.1 | 31.7 | 74.0 | 0.36 | 102 | 116 | 108.0 |
| Reference Comparative Example 6 | 6.97 | 23.40 | 44.16 | 104.70 | 0.42 | 100 | 105 | 92.5 |

|  | Rwp | GOF |
|---|---|---|
| Reference Example 1 | 7.3 | 1.93 |
| Reference Example 2 | 7.0 | 1.87 |
| Reference Example 3 | 6.6 | 1.75 |
| Reference Example 4 | 5.7 | 1.52 |
| Reference Example 5 | 6.5 | 1.69 |
| Reference Example 6 | 6.1 | 1.62 |
| Reference Example 7 | 5.9 | 1.55 |
| Reference Example 8 | 5.1 | 1.35 |
| Reference Example 9 | 7.3 | 1.94 |
| Reference Comparative Example 1 | 7.3 | 1.92 |
| Reference Comparative Example 2 | 6.2 | 1.63 |
| Reference Comparative Example 3 | 6.6 | 1.92 |
| Reference Comparative Example 4 | 5.7 | 1.55 |
| Reference Example 10 | 5.7 | 1.53 |
| Reference Comparative Example 6 | 4.5 | 1.40 |

(Discussion)

Figure 2:
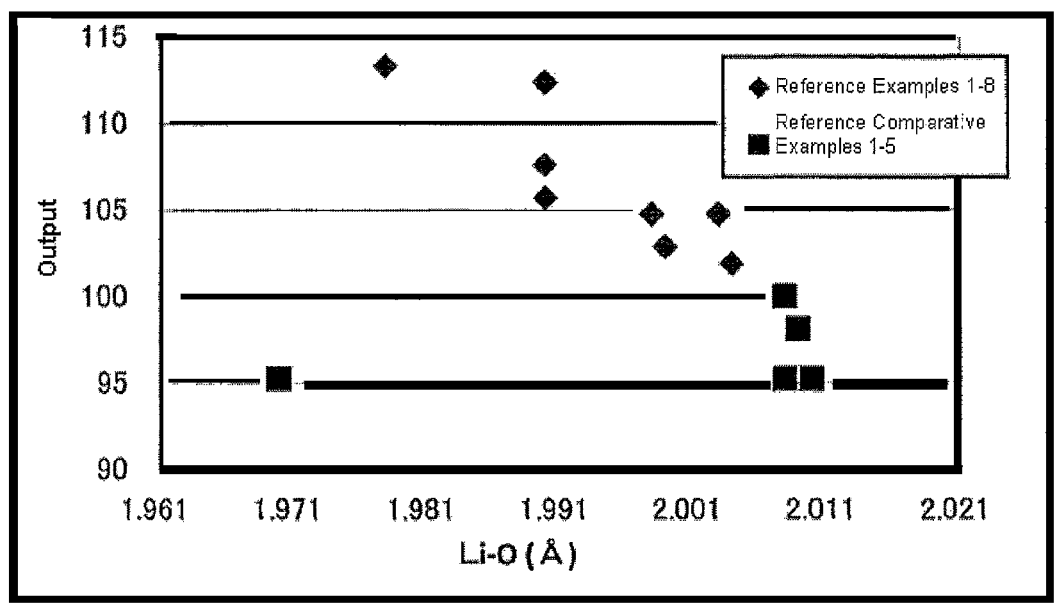
FIG. 2 Graph showing the relationship between the inter-atomic distance Li—O ("Li—O") and the results of the evaluation of output characteristics ("output") for the samples obtained in the reference example and reference comparative examples.

From FIG. 2, it was found that defining the inter-atomic distance Li—O to a given range allows the output characteristics to be raised. It was found that, in so doing, having an inter-atomic distance Li—O of 1.971 Å to 2.006 Å was important, 1.978 Å to 2.004 Å was desirable, and 1.978 Å to 1.990 Å was particularly desirable.

When the inter-atomic distance Li—O is shorter than 1.971 Å, it is expected that Li is immobilized and that Li ions have difficulties moving in the event of Li charging-discharging. Conversely, if it is longer than 2.006 Å, it is believed that a heterogeneous element contaminates the Li layer and prevents movements of Li ions.

Figure 3:
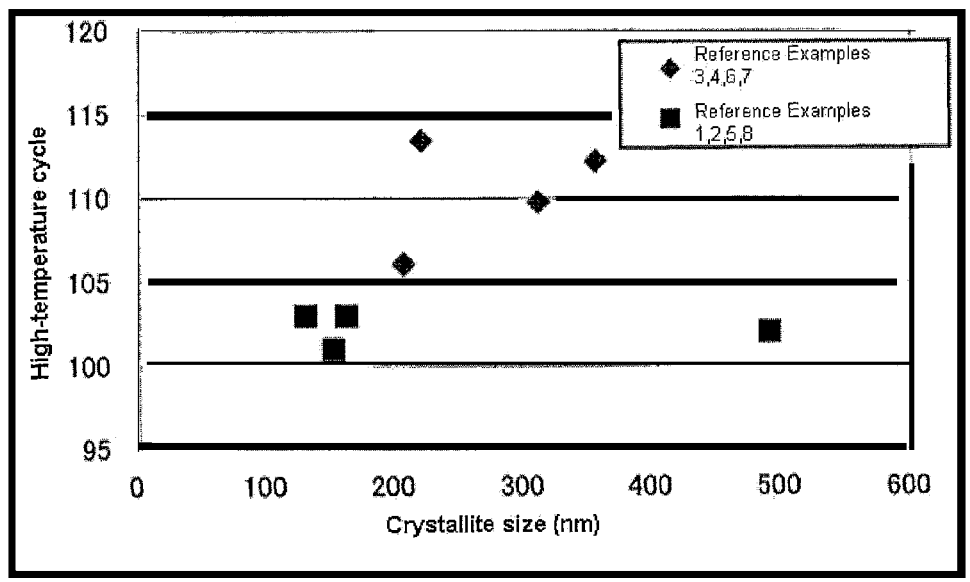
FIG. 3 Graph showing the relationship between the crystallite size and the results of the evaluation of high-temperature cycle life characteristics ("high-temperature cycle") for the samples obtained in the reference example and reference comparative examples.
Figure 4:
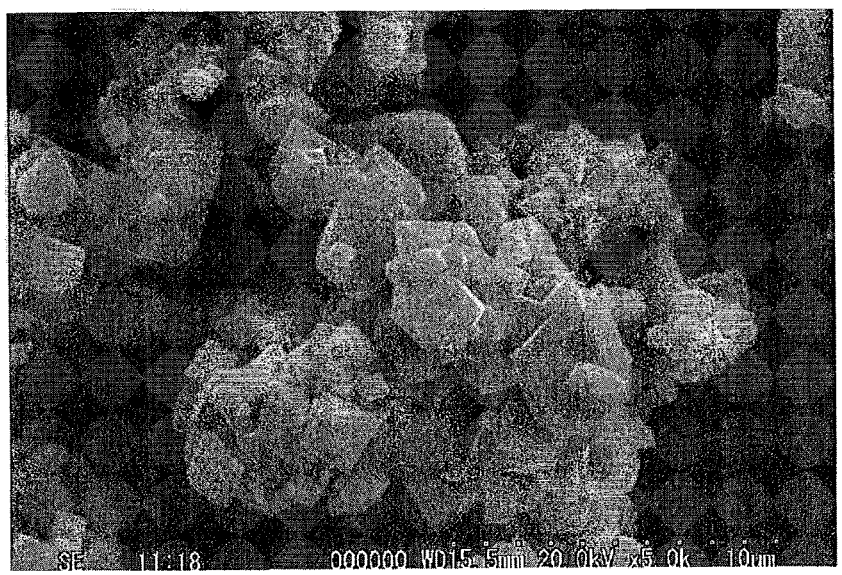
FIG. 4 SEM photograph of the sample obtained in Reference Example 6.
Figure 5:
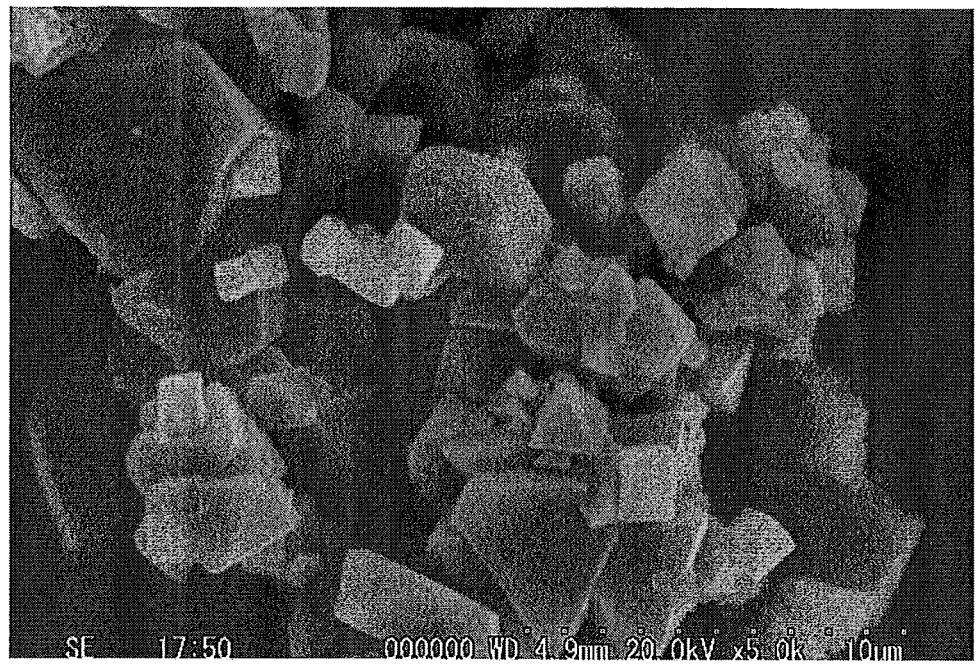
FIG. 5 SEM photograph of the sample obtained in Reference Example 8.

From FIG. 3, it was found that defining the crystallite size to a given range in addition to the above conditions allows the high-temperature cycle life span characteristics to be improved. It was also found that, in so doing, a crystallite size of 170 nm to 490 nm was desirable, in particular 200 nm to 360 nm was desirable, of which 220 nm to 360 nm was more desirable. This is believed to be due to the fact that, the crystallite size having been optimized, the permeability of the electrolytic solution and the reactive surface area when discharged at a high current value are maintained, thereby decreasing the substantial electric current density, attenuating the resistance of movement of the lithium ions on the boundary surface.

In addition, Reference example 10, which contains a boron compound, was revealed to have high filling density (tap density), large crystallite size and high discharge capacity at high-load discharge (3 C) compared to a spinel type lithium transition metal oxide not containing a boron compound (for instance Reference example 1) or the like. Furthermore, it was also revealed that, while adding a boron compound and firing a spinel type lithium transition metal oxide promotes sintering and decreases the specific surface area, which conventionally makes it difficult to obtain an output, defining the inter-atomic distance Li—O to a given range allows the output to be increased.

While the observations regarding the relationship between the range of inter-atomic distance Li—O and the output characteristics in the above discussion are observations based on the reference examples and the reference comparative examples, that is to say, observations regarding positive electrode active substance materials that do not contain a boron compound, when taking into consideration the points that the boron compound is present outside of the spinel in the sample of Reference example 10 and, furthermore, the values of Reference example 10 fall within the ranges described above, and the like, it is thought to be in a similar relationship.

Note that in the Rietveld method analysis, it was observed that when the conditions thereof, High Voltage: 5,616 V was changed to 5,585 V, and the Lorentzian, 1/Cos: 0.01630098 Th was changed to 0.004933548 Th, the distance between Li—O was altered.

Consequently, as a result of analysis by modifying the conditions in this way for all the examples, it was found that, as determined by analyzing with the conditions High Voltage: 5,616 V and Lorentzian, 1/Cos: 0.01630098 Th, the inter-atomic distance Li—O of 1.971 Å to 2.006 Å becomes 1.949 Å to 1.984 Å, 1.978 Å to 2.004 Å becomes 1.956 Å to 1.982 Å, and 1.978 Å to 1.990 Å becomes 1.956 Å to 1.968 Å.

The invention claimed is:

1. A positive electrode active material for lithium battery, containing a spinel type Fd3-m lithium transition metal oxide represented by general formula $Li_{1+x}M_{2-x}O_{4-\delta}$ wherein M consists of Mn, Al and Mg, x represents 0.01 to 0.08 and $0 \leq \delta$, and a boron compound, the spinel type Fd3-m lithium transition metal oxide having an inter-atomic distance Li—O of 1.978 Å to 2.006 Å as measured by the Rietveld method using the fundamental method, and the amount of magnetic deposit measured for the positive electrode active material for lithium battery being 600 ppb or less when measured by a measurement method comprising:

in a 500 cc lidded resinous container, 500 cc of ion-exchanged water and one cylindrical stirring bar-type magnet covered with tetrafluoroethylene wherein the magnet has a range of magnetic force within 100 mT to 150 mT when the magnetic force is measured using TESLA METER Model TM-601 by KANETEC are added to 100 g of positive electrode active substance material in powder form, which is placed on a ball mill rotating stage, and rotating to produce a slurry;

next, the magnet is taken out, immersed in ion-exchanged water and the excess powder attached to the magnet is eliminated with an ultrasound cleaner;

next, the magnet is taken out, immersed in aqua regia, heated at 80° C. for 30 minutes in aqua regia to dissolve magnetic deposits, and aqua regia in which magnetic deposit has dissolved is analyzed for the amounts of iron, nickel, chromium and zinc with ICP Atomic Emission Spectrometer, and, with the total amounts thereof as the amount of magnetic deposit, the amount of magnetic deposit per weight of positive electrode active substance material is calculated.

2. The positive electrode active material for lithium battery according to the claim 1, wherein the spinel type lithium transition metal oxide is represented by the general formula $Li(Li_xMg_yAl_zMn_{2-x-y-z})O_{4-\delta}$ wherein $0.01 \leq x \leq 0.08$, $0.02 \leq y \leq 0.07$, $0.06 \leq z \leq 0.14$ and $0 \leq \delta$.

3. The positive electrode active material for lithium battery according to the claim 1, wherein the crystallite size of the spinel type lithium transition metal oxide is 500 nm to 2000 nm.

4. The positive electrode active material for lithium battery according to claim 2, wherein the crystallite size of the spinel type lithium transition metal oxide is 500 nm to 2000 nm.

5. A lithium battery for an electric vehicle or for a hybrid electric vehicle provided with the positive electrode active material for lithium battery according to claim 1 as a positive electrode active substance.

* * * * *